United States Patent
Wielema et al.

(10) Patent No.: US 6,767,430 B1
(45) Date of Patent: Jul. 27, 2004

(54) PROCESS FOR MAKING PAPER

(75) Inventors: Thomas Albert Wielema, Groningen (NL); Jan Hendriks, Grolloo (NL); Ronald Peter W. Kesselmans, Annen (NL); Jacob Terpstra, Assen (NL)

(73) Assignee: Cooperatieve Verkoop-en Productievereniging van Aardappelmeel en Derivaten AVEBE B.A., Ja Veendam (NL)

( * ) Notice: Subject to any disclaimer, the term of this patent is extended or adjusted under 35 U.S.C. 154(b) by 4 days.

(21) Appl. No.: 10/130,655

(22) PCT Filed: Nov. 23, 2000

(86) PCT No.: PCT/NL00/00858

§ 371 (c)(1),
(2), (4) Date: Aug. 28, 2002

(87) PCT Pub. No.: WO01/38635

PCT Pub. Date: May 31, 2001

(30) Foreign Application Priority Data

Nov. 25, 1999 (EP) ............................................. 99203980

(51) Int. Cl.[7] ............................................. D21H 17/28

(52) U.S. Cl. ....................................................... 162/175
(58) Field of Search .......................................... 162/175

(56) References Cited

U.S. PATENT DOCUMENTS

| 3,884,909 A | 5/1975 | Kightlinger et al. |
| 4,843,118 A | 6/1989 | Lai et al. |
| 5,122,231 A | 6/1992 | Anderson |
| 5,368,690 A | 11/1994 | Solarek et al. |

FOREIGN PATENT DOCUMENTS

| EP | 0011303 A | 5/1980 |
| WO | 9301353 A | 1/1993 |
| WO | 9746591 A | 12/1997 |

*Primary Examiner*—Peter Chin
(74) *Attorney, Agent, or Firm*—Hoffmann & Baron, LLP

(57) ABSTRACT

The invention relates to a process for making paper and to the use of starch in said process. In particular, the invention relates to a process for making paper, wherein in the wet-end a cross-linked starch is added to an aqueous suspension of cellulose-based fibers, which starch has a degree of cross-linking of, measured as a FANN viscosity at 300 rpm, of less than 50 mPas, and a FANN-A value of less than 2.5.

10 Claims, No Drawings

PROCESS FOR MAKING PAPER

This application is the U.S. National Phase of International Application Number PCT/NL00/00858 filed on Nov. 23, 2000, which is incorporated herein by reference.

BACKGROUND OF THE INVENTION

The invention relates to a process for making paper and to the use of starch in said process.

In order to increase the strength properties of paper, it is common practice to add cationic starch at the wet-end stage of the papermaking process. The wet-end of the papermaking process refers to the stages of the papermaking process, wherein a pulp of fibers obtained from cellulose-based materials, such as recycled, used paper, wood, cotton, or alternative sources, is being processed. The term "wet-end" originates in the large amounts of water, in the presence of which the pulp is processed.

Recently, there have been several, trends in the papermaking industry, which call for more starch in the paper. One of these trends is the environmental demand to recycle paper. As paper is recycled, the fibers of the paper tend to become shorter and weaker, the latter of which is due to reduced interactions among the fibers. As a result, increased amounts of starch are necessary in the wet-end of the papermaking in order to produce a paper which is sufficiently strong. It has been found that after paper has been recycled a certain number of times, the loss of strength due to recycling cannot always be compensated by simply adding starch. Accordingly, recycling ultimately leads to paper having an inferior paper strength.

Another trend is the urge to produce cheaper paper. This can be achieved by incorporating large amounts of a cheap filler into the paper. However, a larger filler content of the paper results in a deterioration of paper strength, which gives rise to a demand for the addition of increased amounts of starch in the wet-end.

Yet another trend concerns a change in the apparatuses used in the papermaking process. The conventionally used size-press is more and more being replaced by a premetering size-press. The use of a premetering size-press often has the effect that starch penetrates to a lesser degree into a paper sheet than when a conventional size-press is used. As a result, the starch provides a smaller contribution to the strength of the paper. Moreover, the use of a premetering-size press for pigmentizing diminishes the internal strength of the paper even more. Therefore, it is desired to incorporate higher amounts of starch in the paper, leading to an increase of the strength of the paper. In this regard, it is particularly important that, when increased amounts of starch are added in the wet-end of the papermaking process, a high retention of said starch is obtained. In other words, it is important that the high amounts of starch are actually incorporated into the paper, and are not lost in the process water of the pulp.

In "Anionic starch: an effective wet-end concept for enhancing paper strength", Proceedings of the PITA Annual Conference, 87–91, Manchester, October 1997, J. Terpstra and R. P. Versluijs have proposed to use anionic starch instead of cationic starch as a strengthening agent in the wet-end of the papermaking process, in order to achieve a greater internal strength of the paper produced. This concept of using anionic starch has also been described in P. H. Brouwer, Wochenblatt für Papierfabrikacion, 19 (1997), 928–937 WO-A-93/01353 WO-A-96/05373, and may be explained as follows.

The fibers and filler particles, which are used to produce paper from, are negatively charged. When cationic starch is used as a paper strengthening agent, its retention is mainly caused by the interaction between the positively charged starch and the negatively charged fibers and filler particles. In order to adhere anionic starch molecules onto anionic fibers and filler particles, use is made of a so-called cationic fixative. In principle, any cationic paper aid can be used as a fixative for the anionic starch, although some lead to better results than others. Because they are cheap and hardly affected by water hardness, polyaluminum chlorides are considered very attractive fixatives. Other materials that have been proposed for use as a fixative in this regard are, inter alia, alum, or cationic polymers, such as polydimethyldiallylammonium chloride and polyamines.

It has been found that, by using anionic starch in combination with a suitable fixative, it is possible to incorporate up to five times as much starch into a paper sheet in comparison with the case wherein only cationic starch is used as a strengthening agent. Of course, this results in a much stronger paper sheet. At the same time, the retention of the starch in a papermaking process is much higher when anionic starch and a fixative are used instead of cationic starch.

A disadvantage of the use of anionic starch instead of cationic starch in the wet-end of the papermaking process resides in the necessity of using a fixative. Even though some of the fixatives proposed in the art are relatively cheap, the costs of the paper that is produced may increase considerably because of the use of the fixative. Also, as the fixative is a cationic compound, it is inevitable that anionic counterions are added to the paper along with the fixative. Often, the counterions are chloride ions which are corrosive. Furthermore, the use of a fixative may lead to a hardening of the process water and to the production of salts, which may interfere with other papermaking aids.

Accordingly, a need exists for the provision of an alternative manner of increasing the amount of starch that can be incorporated into paper by addition thereof in the wet-end of the papermaking process. This alternative manner should preferably not have the disadvantages discussed above. It is particularly desired that the use of a fixative may be omitted.

SUMMARY OF THE INVENTION

Surprisingly, it has now been found that the above goals can be reached by using a specific type of cross-linked starch in the wet-end of the papermaking process. Thus, the invention relates to a process for making paper, wherein in the wet-end a cross-linked starch is added to an aqueous suspension of cellulose-based fibers, which starch has a degree of cross-linking, measured as a FANN viscosity at 300 rpm, of less than 50 mPas, preferably less than 25 mPas, and a FANN-A value of less than 2.5, preferably less than 0.5.

It is a great advantage of the present invention, that the means are provided for incorporating amounts of starch into paper by addition of starch in the wet-end of the papermaking process, which were hitherto not possible without the use of additives. Further, the retention of the starch added in the wet-end of a papermaking process according to the invention is significantly increased in comparison with the prior art processes. Furthermore, in case the added starch is an anionic starch, it has been found that it is not necessary to add a fixative

DETAILED DESCRIPTION OF THE INVENTION

The cross-linked starch used in a process according to the invention, may in principle be any type of starch, such as starch from potato, tapioca, maize, wheat, barley and so forth. It is preferred, however, that a root or tuber starch is used. These types of starch generally contain lower amounts of lipids and proteins than cereal and fruit types of starch. Consequently, the risk of problems related odor and foaming are reduced. Potato and tapioca starches have proven to be particularly suitable.

In a preferred embodiment, the starch comprises at least 95 wt. %, more preferably at least 98 wt. %, based on dry substance of starch, of amylopectin. It has been found that the use of these amylopectin-type starches leads to even higher retentions of starch in paper.

Most starch types consist of granules in which two types of glucose polymers are present. These are amylose (15–35 wt. % on dry substance) and amylopectin (65–85 wt. % on dry substance). Amylose consists of unbranched or slightly branched molecules having an average degree of polymerization of 1000 to 5000, depending on the starch type. Amylopectin consists of very large, highly branched molecules having an average degree of polymerization of 1,000,000 or more. The commercially most important starch types (maize starch, potato starch, wheat starch and tapioca starch) contain 15 to 30 wt. % amylose.

Of some cereal types, such as barley, maize, millet, wheat, milo, rice and sorghum, there are varieties of which the starch granules nearly completely consist of amylopectin. Calculated as weight percent on dry substance, these starch granules contain more than 95%, and usually more than 98% amylopectin. The amylose content of these cereal starch granules is thus less than 5%, and usually less than 2%. The above cereal varieties are also referred to as waxy cereal grains, and the amylopectin-starch granules isolated therefrom as waxy cereal starches.

In contrast to the situation of different cereals, root and tuber varieties of which the starch granules nearly exclusively consist of amylopectin are not known in nature. For instance, potato starch granules isolated from potato tubers usually contain about 20% amylose and 80% amylopectin (wt. % on dry substance). During the past 10 years, however, successful efforts have been made to cultivate by genetic modification potato plants which, in the potato tubers, form starch granules consisting for more than 95 wt. % (on dry substance) of amylopectin. It has even been found feasible to produce potato tubers comprising substantially only amylopectin.

In the formation of starch granules, different enzymes are catalytically active. Of these enzymes, the granule-bound starch synthase (GBSS) is involved in the formation of amylose. The presence of the GBSS enzyme depends on the activity of genes encoding for said GBSS enzyme. Elimination or inhibition of the expression of these specific genes results in the production of the GBSS enzyme being prevented or limited. The elimination of these genes can be realized by genetic modification of potato plant material or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum tuberosum L.*)", Theor. Appl. Gent., (1987), 75:217–221, and E. Jacobsen et al., "Introduction of an amylose-free (amf) mutant into breeding of cultivated potato, *Solanum tuberosum L.*, Euphytica, (1991), 53:247–253.

Elimination or inhibition of the expression of the GBSS gene in the potato is also possible by using so-called antisense inhibition. This genetic modification of the potato is described in R. G. F. Visser et al., "Inhibition of the expression of the gene for granule-bound starch synthase in potato by antisense constructs", Mol. Gen. Genet., (1991), 225:289–296.

By using genetic modification, it has been found possible to cultivate and breed roots and tubers, for instance potato, yam, or cassave (Patent South Africa 97/4383), of which the starch granules contain little or no amylose. As referred to herein, amylopectin-potato starch is the potato starch granules isolated from potato tubers and having an amylopectin content of at least 95 wt. % based on dry substance. This amylopectin-potato type starch is particularly preferred for use in the present invention.

As has been mentioned above, an important aspect of the invention is that the starch is cross-linked. In principle, any cross-linking known in the derivatization of starch is suitable. For an overview of known cross-linking reactions, reference is made to O. B. Wurzburg (Ed.), "Modified Starches: Properties and Uses", CRC Press Inc., Boca Eaton, Fla., 1986. Preferred agents for cross-linking the starch are epichlorohydrin, dichloropropanol, sodium trimetaphosphate, phosphorousoxychloride, adipic acid anhydride, and combinations thereof.

The reaction wherein the cross-linking is accomplished is known in itself and can be performed in any known manner. Examples of suitable manners of performing the cross-linking include reactions in an aqueous or alcoholic suspension of starch, under semi-dry or dry conditions, or in an aqueous solution of starch. Under dry conditions the cross-linking can by achieved by reaction with phosphoric acid or salts thereof or by oligomeric phosphate salts like sodium tripolyphosphate, sodium trimetaphosphate. Cross-linking can also be performed by the so-called heat-moisture treatment or annealing.

The degree of cross-linking is in accordance with the invention defined in terms of its FANN viscosity and its FANN-A value. The starch that is used exhibits a FANN viscosity of less than 50 mPas at 300 rpm, preferably less than 25 mPas. The FANN-A value of the starch is less than 2.5, preferably less than 0.5.

The FANN viscosity is in accordance with the invention defined as the viscosity that can be measured with a FANN viscosimeter, as described in American Petroleum Institute (API) 13B1, second edition, September 1997, section 4.3. Said viscosity is dependent on the rpm-value (rounds per minute, frequency of stirring) at which the apparatus is set for stirring the solution of suspension to be measured, and two constants (A and p) which can be determined by measuring the viscosity at different rpm-values.

The rheology of starch solutions and suspensions is among others described by R. Schutz, in Starch, 1963, pp. 394–400. From this publication, the following formula can be derived for the apparent viscosity of (non-Newtonian) starch solutions:

$$\text{Viscosity} = A * \text{rpm}^{(1-p)}.$$

In this formula, 'Viscosity' is the FANN viscosity measured, A is the FANN-A value (the viscosity for Newtonian liquids in mPa.s), p represents the deviation form Newtonian viscosity behavior (for Newtonian viscosity behavior p=0), and rpm stands for the rpm-value at which the measurement is carried out.

The starch used in accordance with the invention may be cationic, anionic, nonionic or amphoteric. If a modification is necessary for making the starch cationic, anionic, nonionic or amphoteric, this modification can be carried out before, during or after the cross-linking of the starch. Suitable derivatives of starch in this regard are starches wherein, e.g. non-ionic or cationic substituents are introduced by etherification or esterification reactions, such as methylation, ethylation, hydroxyethylation, hydroxypropylation, alkylglycidylation (wherein the length of the alkyl chain varies from 1 to 20 carbon atoms), acetylation, propylation, carba-imidation, diethylaminoethylation, and/or trimethylammoniumhydroxypropylation. A description of possible modifications and of how they may be carried out can be found in the above referenced book by Wurzburg.

An anionic starch is in accordance with the invention defined as a starch having a charge density of at least $-0.03$ $\mu$eq/mg. Surprisingly, it has been found possible to incorporate very high amounts of starch in paper by adding a cross-linked, anionic type starch, in accordance with the invention, to the wet-end of the papermaking process, even without using a fixative. In the context of the invention, the charge density is defined as the amount of a cationic polymer (methyl glycol chitosan iodide, Sigma M-3150) which has to be added to a known amount of dissolved starch in order to reach the equivalence point. This equivalence point may be determined by measuring the electrophoretic zetapotential of the dispersion to which silicate particles are added as indicator. The zetapotential can for instance be measured by using a Malvern Zetasizer 3.

Examples of anionic starch may be obtained by introduction of any anionic substituents or by any oxidation process known in the derivatization of starch. Suitable examples of anionic substituents are phosphate, phosphonate, sulfonate, sulfate, (alkyl)succinate, sulfosuccinate, anionic graft copolymers and combinations thereof. An example of a suitable oxidation is oxidation by hypochlorite. Preferably, a carboxymethyl of phosphated starch is used. The degree of substitution (DS), which is the molar ratio between the amount of substituted hydroxyl groups of a glucose unit in the starch and the amount of glucose units in the starch, may range between 0.005 and 0.5, preferably between 0.01 and 0.2, more preferably between 0.01 and 0.1.

Depending on the type of anionic starch and pulp used, and on the conditions of the papermaking process, it may be useful to use small amounts of a fixative. In accordance with the invention, suitable fixatives are cationically charged compounds, which are capable of binding anionic starch to anionic paper fibers and filler particles. In principle, any cationic compound that has been proposed for use as a fixative for anionic starch in the wet-end of a papermaking process can be used.

Examples include alum, cationic starch or derivatives thereof, polyaluminum compounds, and cationic polymers, such as polydimethyldiallylammonium chlorides, polyamines, polyvinylamines, polyacrylamides, polyethylene imines, dicyandiamide polycondensates, or other high molecular weight cationic polymers or copolymers, e.g. comprising a quaternized nitrogen atom or polyvinyl alcohol, and combinations thereof. Such cationic polymers preferably should have a weight average molecular weight of at least about 10,000, preferably at least about 50,000, more preferably at least 100,000. In a preferred embodiment, the cationic polymers have a weight average molecular weight in the range from about 50,000 to about 2,000,000.

Preferably, a fixative having a high charge density is used. In this regard, a charge density higher than 1 $\mu$eq/mg. is considered a high charge density. The charge density of the fixative is defined as the amount of an anionic polymer (sodium polystyrenesulfonate, Aldrich cat. no. 24,305-1) which has to be added to a known amount of fixative (typically a few milliliters of the fixative in 500 ml demineralized water) in order to reach the equivalence point. This equivalence point may be determined by measuring the electrophoretic zetapotential of the dispersion to which silicate particles are added as indicator. The zetapotential can for instance be measured by using a Malvern Zetasizer 3. It has been found that the use of a fixative having a higher charge density leads to a decreased sensitivity of the papermaking process for the hardness and conductivity of the process water. Preferred fixatives having a high charge density are polyaluminum compounds, such as polyaluminum chloride or polyaluminum sulfate, polydimethyldiallylammonium chlorides, polyamines, and combinations thereof.

Generally, the ratio of the weight of fixative with respect to the weight of anionic starch will be below 1:1 for inorganic fixatives, and below 1:4 for organic fixatives. Preferably, said ratio is smaller than 1:6. If it appears possible to achieve sufficient adsorption of starch added, in the wet-end to the paper fibers in the wet-end, it is preferred to use no fixative. It is noted that in this regard a distinction should be made between adsorption and retention. Retention refers to the amount of starch added in the wet-end that is eventually incorporated in the paper, while adsorption refers to the amount of starch added in the wet-end that adsorbs to the paper fibers in the pulp in the wet-end. The skilled person will be able to adjust the amount of the fixative to the circumstances at hand. Generally, an adsorption of at least 60%, preferably at least 80%, more preferably at least 90% of the anionic starch is considered sufficient. The retention is generally considered sufficient if it has a value of at least 50%, preferably at least 65%, more preferably at least 75%.

A nonionic, or amphoteric starch in accordance with the invention is a starch having a charge density between $-0.03$ $\mu$eq/mg and $+0.03$ $\mu$eq/mg. Suitable amphoteric starches in this regard are for instance cross-linked starches wherein, a cationic substituent is combined with an anionic substituent. Cationic substituents may be introduced by etherification or esterification reactions, such as diethylaminoethylation, trimethylammoniumhydroxypropylation or dimethylalkylammoniumhydroxypropylation or combinations thereof. Suitable examples of anionic substituents are for example phosphate, phosphonate, sulfate, sulfosuccinate, (alkyl) succinate, anionic copolymers and combinations thereof. It is also possible to introduce an anionic substituent in an oxidation reaction. An example of a suitable oxidation is the oxidation with hypochlorite. Suitable cross-linking agents for amphoteric starch are epichlorohydrin, dichloropropanol, sodium trimethaphosphate, phosphorousoxychloride, adipic acid anhydride, and combinations thereof. The reaction sequence for the introduction of the anionic substituent, the cationic substituent and the cross-links can be chosen freely and in any order.

Depending on the type of amphoteric starch and pulp used, and on the conditions of paper making it may be useful to use small amounts of a fixative as described above for the cross-linked anionic starches. It has been found possible to incorporate very high amounts of starch by adding a cross-linked, amphoteric type starch, in accordance with the invention, to the wet-end of the papermaking process, even without using a fixative.

A cationic starch in accordance with the invention is a starch having a charge density of at least $+0.03$ $\mu$eq/mg. Suitable cationic starches in this regard are for instance cross-linked starches wherein, cationic substituents are introduced by etherification or esterification reactions, such as diethylaminoethylation, trimethylammoniumhydroxypropylation or dimethylalkylammoniumhydroxypropylation or combinations thereof. Non-ionic substituents can be introduced into the cationic starches by reactions such as methylation, ethylation, hydroxyethylation, hydroxypropylation, alkylglycidation (wherein the length of the alkyl chain may vary from 1 to 20 carbon atoms), acetylation, propylation or carba-imidation and combinations thereof. Suitable cross-linking agents for cationic starch are epichlorohydrin, dichloropropanol, sodium trimethaphosphate, phosphorousoxychloride, adipic acid anhydride, and combinations thereof. The reaction sequence for the introduction of the non-anionic substituent, the cationic substituent and the cross-links can be chosen freely and in any order. It has been found possible to incorporate very high amounts of starch by adding a cross-linked, cationic amylopectin root or tuber starch, preferably potato starch, in accordance with the invention, to the wet-end of the papermaking process, even in a pulp with a high conductivity and hardness. Thus, particularly a process for making paper wherein relatively hard water is used benefits from this embodiment of the invention.

The pulp that is used for making paper in a process according to the invention may be any aqueous suspension of cellulose-based fibers that can be used to make paper from. After the anionic starch and, optionally, the fixative have been added to the pulp, the pulp may be processed into paper in any known manner.

In a process for making paper, the cross-linked starch, or a derivative of said starch, and, optionally the fixative, are added at the wet-end of the process. This means that they are added to a pulp comprising fibers obtained from recycled paper or from wood and water. It is common practice to add a filler compound to the pulp. In accordance with the invention, any of the commonly used filler compounds, such as clay, ground $CaCO_3$, precipitated $CaCO_3$, talc or titanium-dioxide, may be employed. Preferably, the filler compound is added to the pulp prior to the addition of the starch, and optionally the fixative. In accordance with the invention, it is further possible to add the cross-linked starch to a pulp in combination with a cationic, inorganic or polymeric coagulant. The thus obtained suspension may be flocculated by means of an anionic swelling clay or other anionic retention aid. Commonly used retention aids are micropartial systems commercially available under the name of Hydrocol and Composil.

The invention will now be elucidated by the following, non-restrictive examples.

EXAMPLE 1

Preparation of HD990205-1

A solution of 30 g urea and 31.1 g phosphoric acid (85%) in 85 ml of water was neutralized to pH 6.0 with 50% NaOH. This solution was mixed with 600 g of potato starch (moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 140° C. in a fluid bed reactor for 30 minutes.

EXAMPLE 2

Preparation of HD990205-4

A solution of 30 g urea and 31.1 g phosphoric acid (85%) in 85 ml of water was neutralized to pH 6.0 with 50% NaOH. This solution was mixed with 600 g of potato starch (moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 160° C. in a fluid bed reactor for 30 minutes.

EXAMPLE 3

Preparation of MS980818A

A solution of 30 g urea and 31.1 g phosphoric acid (85%) in 85 ml of water was neutralized to pH 6.0 with 50% NaOH. This solution was mixed with 600 g of amylopectin potato starch (moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 140° C. in a fluid bed reactor for 30 minutes.

EXAMPLE 4

Preparation of MS980818D

A solution of 30 g urea and 31.1 g phosphoric acid (85%) in 85 ml of water was neutralized to pH 6.0 with 50% NaOH. This solution was mixed with 600 g of amylopectin potato starch (moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 155° C. in a fluid bed reactor for 30 minutes.

EXAMPLE 5

Measurement of the Fann Viscosity

The Fann viscosity was measured by suspending 8.0 g (dry weight) sample in 150 g demineralized water. After adjusting the temperature to 35° C., 250 ml of a 50% KCSN solution was added and the starch sample was dissolved by stirring for 15 minutes at 35° C. the viscosity was measured in a Fann viscosity meter at 100, 200, 300 and 600 rpm. The Fann-A and Fann-p value were calculated from the following formula:

$$\text{Viscosity} = A * \text{rpm}^{(1-p)}$$

The results are depicted in table 1.

TABLE 1

Results of the Fann measurements.

| | 100 rpm | 200 rpm | 300 rpm | 600 rpm | Fann-A | Fann-p |
|---|---|---|---|---|---|---|
| MS980818-A | 60 | 94 | 120 | 185 | 3.358 | 0.3728 |
| MS980618-D | 22 | 32 | 37 | 56 | 2.062 | 0.4865 |
| HD990205-1 | 27 | 39 | 47 | 72 | 2.189 | 0.4568 |
| HD990205-4 | 16 | 24 | 31 | 47.5 | 0.965 | 0.4915 |

EXAMPLE 6

The adsorption of the starches on to solid pulp components was studied as follows.

To a pulp (consistency of 1%) starch was added (dosage 3% on consistency). The pulp was stirred in a baffled beaker at 800 rpm. After 30 seconds a fixative was added and after 60 seconds the pulp was filtered. The starch adsorption was determined by measuring the amount of non-adsorbed starch in the filtrate. The pulp was a birch sulphate pulp beaten to 34° SR (measured at 21° C.) at a consistency of 2% in tap-water using a Hollander. After beating the pulp was diluted to a consistency of 1% with tap-water. The conductivity of the pulp was set at 3000 µS/cm and the hardness at 40° GH by a combination of $CaCl_2$ and $Na_2SO_4$.

The starches were cooked with life steam starting with a 10% slurry in tap-water. After cooking the starch solutions were diluted to 1%. The used fixatives were Paper Pac N (obtained from Sachtleben Chemie GmbH, Germany) and Starfix 01 (obtained from Ciba Specialty Chemicals, United Kingdom). Before use, the Paper Pac N was diluted by a factor of 10 with demineralized water.

Starfix 01 was dissolved as a 1% solution. The amount of starch in the filtrate was determined with an enzymatic method. In accordance with this method, starch is first converted into glucose with an α-amylase and an amyloglucosidase. Subsequently, the amount of glucose is determined spectroscopically using a hexokinase test method (Boehringer no. 716251). The amount of starch is calculated from the obtained amount of glucose using a correction factor for incomplete conversion of the starch into glucose by the enzymes. This correction factor depends on the type of starch and was determined separately by standard methods.

An overview of the starch adsorptions for the starches prepared according to example 1 to 4 are given in table 2 for Paper Pac N as fixative and in table 3 for Starfix 01 as fixative.

TABLE 2

Starch adsorptions with Paper Pac N.

| Starch | Dosage Paper Pac N (as is; % on fiber) | Starch adsorption (%) |
|---|---|---|
| HD990205-1 | 2.0 | 45 |
| HD990205-1 | 4.0 | 61 |
| HD990205-4 | 0.5 | 82 |
| HD990205-4 | 1.0 | 87 |
| MS980818A | 1.0 | 38 |
| MS980818A | 3.0 | 64 |

TABLE 3

Starch adsorptions with Starfix 01.

| Starch | Dosage Starfix 01 (as dry: % on fiber) | Starch adsorption (%) |
|---|---|---|
| HD990205-1 | 0.10 | 40 |
| HD990205-1 | 0.25 | 59 |
| HD990205-4 | 0.05 | 84 |
| HD990205-4 | 0.10 | 88 |
| MS980818A | 0.25 | 60 |
| MS980818A | 0.50 | 74 |
| MS980818D | 0.025 | 85 |
| MS980818D | 0.05 | 93 |

From both tables can be seen that by introducing cross-links in anionic starch the amount of fixative needed is reduced considerable.

EXAMPLE 7

Preparation of HD990813-2

A solution of 30 g urea and 31.1 g phosphoric acid (85%) in 85 ml of water was neutralized to pH 6.0 with 50% NaOH. This solution was mixed with 600 g of cationic amylopectin potato starch (Posamyl-XL, moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 145° C. in a fluid bed reactor for 30 minutes.

EXAMPLE 9

Preparation of HD990813-4

A solution of 30 g urea and 31.1 g phosphoric acid (85%) in 85 ml of water was neutralized to pH 6.0 with 50% NaOH. This solution was mixed with 600 g of cationic amylopectin potato starch (Posamyl-XL, moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 160° C. in a fluid bed reactor for 30 minutes.

EXAMPLE 10

Preparation of HD990820-2

A solution of 30 g urea and 31.1 g phosphoric acid (85%) in 85 ml of water was neutralized to pH 6.0 with 50% NaOH. This solution was mixed with 600 g of cationic potato starch (Amylofax-PW, moisture 20%) for 30 minutes in a Hobart mixer. The mixture was equilibrated and subsequently dried in a Retsch fluid bed dryer at 60° C. for 30 minutes and at 90° C. for 30 minutes. The mixture was heated at 145° C. in a fluid bed reactor for 30 minutes.

EXAMPLE 11

Preparation of HD990820-4

A solution of 30 g urea and 31.1 g phosphoric acid (85%) in 85 ml of water was neutralized to pH 6.0 with 50% NaOH. This solution was mixed with 600 g of cationic potato starch (Amylofax-PW, moisture 20%) for 30 minutes in a Hobart mixer. The mixture was equilibrated and subsequently dried in a Retsch fluid bed dryer at 60 ° C. for 30 minutes and at 90° C. for 30 minutes. The mixture was heated at 160° C. in a fluid bed reactor for 30 minutes.

EXAMPLE 12

Measurement of the Fann Viscosity

The Fann viscosity of the amphoteric starches described in example 8 to 11 was measured according to example 5. The results are depicted in table 4.

TABLE 4

Results of the Fann measurements.

| | 100 rpm | 200 rpm | 300 rpm | 600 rpm | Fann-A | Fann-p |
|---|---|---|---|---|---|---|
| HD990813-2 | 55 | 84 | 110 | 166 | 3.184 | 0.3811 |
| HD990813-4 | 10 | 19 | 23 | 38 | 0.360 | 0.2663 |
| HD990820-2 | 42 | 56 | 65 | 91 | 5.786 | 0.5716 |
| HD990820-4 | 10 | 17 | 22 | 34 | 0.447 | 0.3193 |

EXAMPLE 13

The adsorption of the amphoteric starches on to solid pulp components was measured according to example 6.

An overview of the starch adsorptions for the amphoteric starches are given in table 5 for Paper Pac N as fixative and in table 6 for Starfix 01 as fixative.

TABLE 5

Starch adsorptions with Paper Pac N.

| Starch | Dosage Paper Pac N (as is; % on fiber) | Starch adsorption (%) |
|---|---|---|
| HD990813-2 | 1.0 | 53 |
| HD990813-2 | 1.5 | 60 |
| HD990813-4 | 0.5 | 96 |
| HD990813-4 | 1.0 | 99 |
| HD990820-2 | 1.0 | 40 |
| HD990820-2 | 1.5 | 50 |
| HD990820-4 | 0.5 | 79 |
| HD990820-4 | 1.0 | 85 |

TABLE 6

Starch adsorptions with Starfix 01.

| Starch | Dosage Paper Pac N (as is; % on fiber) | Starch adsorption (%) |
|---|---|---|
| HD990813-2 | 0.25 | 54 |
| HD990813-2 | 0.50 | 60 |
| HD990813-4 | 0.0625 | 98 |
| HD990813-4 | 0.125 | 99 |
| HD990820-2 | 0.25 | 49 |
| HD990820-2 | 0.50 | 52 |
| HD990820-4 | 0.125 | 79 |
| HD990820-4 | 0.25 | 85 |

From both tables can be seen that by introducing crosslinks in amphoteric starch the amount of fixative needed is reduced considerable.

EXAMPLE 13

Preparation of HD980417-0

1.0 Kg of amylopectin potato starch (0.81 kg dry matter) was suspended in 1.0 kg of water. The temperature of the suspension was increased to 35° C. 57.9 g of a 3-chloro-2-hydroxypropyltrimethylammonium chloride solution containing 65% active material was added. Finally, 410 g of a 4.4% sodium hydroxide solution was added. After 20 hours the reaction mixture was neutralised to pH 4.0 by the addition of 6 N HCl, whereupon the product was dewatered and washed before drying.

EXAMPLE 14

Preparation of HD980417-1

1.0 Kg of amylopectin potato starch (0.81 kg dry matter) was suspended in 1.0 kg of water. The temperature of the suspension was increased to 35° C. 57.9 g of a 3-chloro-2-hydroxypropyltrimethylammonium chloride solution containing 65% active material was added, followed by 400 mg sodium trimethaphosphate dissolved in 8 ml of water. Finally, 410 g of a 4.4% sodium hydroxide solution was added. After 20 hours the reaction mixture was neutralised to pH 4.0 by the addition of 6 N HCl, whereupon the product was dewatered and washed before drying.

EXAMPLE 15

Measurement of the Fann Viscosity

The Fann viscosity of the cationic amylopectin starches described in example 13 to 14 was measured according to example 5. The results are depicted in table 7.

TABLE 7

Results of the Fann measurements.

| | 100 rpm | 200 rpm | 300 rpm | 600 rpm | Fann-A | Fann-p |
|---|---|---|---|---|---|---|
| HD980417-0 | 61 | 90 | 115 | 172 | 4.205 | 0.4202 |
| HD980417-1 | 2 | 5 | 7 | 13 | 0.019 | 0.0342 |

EXAMPLE 16

The performance of the cationic starches was assessed by experiments with the dynamic drainage analyzer (DDA).

This apparatus determines the dewatering time of the pulp by measuring the under pressure which is applied in order to dewater the pulp. A characteristic drop in the vacuum when the dewatering is complete is indicated as the dewatering time. For each experiment 500 g pulp was used. During the experiments the pulp was stirred at 2000 rpm. If the beginning of the stirring is denoted t=0, the starch (3% on fibers) is added at t=10 seconds and the dewatering started at t=60 seconds. The filtrate of the wire water was used for determining the amount of non-adsorbed starch. This amount was determined enzymatically according to the method described above. The pulp was a birch sulfate pulp as described in example 6. The pulp was used in 1% consistency both in tap-water (500 $\mu$S/cm and 11°GH) and at 3000 $\mu$S/cm conductivity and a hardness of 80°GH. The starches were cooked with life steam starting with a 10% slurry in tap-water. After cooking the starch solutions were diluted to 1%. The starches prepared according to example 13 and 14 were compared with a commercial cationic cross-linked way-maize derivative from National Starch (Microcat 130). The results are described in table 8.

TABLE 8

Results DDA measurements.

| DDA measurement Pulp | Dewatering time (sec) | | Starch adsorption (%) | |
|---|---|---|---|---|
| | 500 $\mu$S/cm and 11 °GH | 3000 $\mu$S/cm and 80 °GH | 500 $\mu$S/cm and 11 °GH | 3000 $\mu$S/cm and 80 °GH |
| HD980417-0 | 35 | 24 | 87 | 46 |
| HD980417-1 | 20 | 23 | 100 | 96 |
| Microcat 130 | 19 | 23 | 99 | 89 |

From the results can be seen that application of cross-linked cationic starch is favorable in pulps with high conductivity and hardness. Furthermore, cross-linked cationic amylopectin potato starch is less susceptible for high pulp conductivity and high water hardness compare to the waxy-maize derivative. This improved performance of amylopectin potato starch originates from the presence of phosphate groups, resulting in a partial amphoteric behavior.

What is claimed is:

1. A process for making paper, wherein in the wet-end a cross-linked anionic starch is added to an aqueous suspension of cellulose-based fibers, which starch has a degree of cross-linking, measured as a FANN viscosity at 300 rpm, of less than 50 mPas, and a FANN-A value of less than 2.5.

2. A process according to claim 1, wherein the degree of cross-linking is less than 25 mPas.

3. A process according to claim 1, wherein the FANN-A value is less than 0.5.

4. A process according to claim 1, wherein the starch is a root or tuber starch.

5. A process according to claim 4, wherein the starch is a potato or tapioca starch.

6. A process according to claim 1, wherein the starch comprises at least 95 wt. %, preferably at least 98 wt. %, based on dry substance of starch, of amylopectin.

7. A process according to claim 1, wherein the starch is cross-linked using epichlorohydrin, dichloropropanol, sodium trimetaphosphate, phosphorous-oxychloride, adipic acid anhydride, or a combination thereof.

8. A paper obtained by a process according to claim 1.

9. In a process for making paper, an improvement for increasing the amount of starch incorporated into said paper comprising using cross-linked anionic starch having a degree of cross-linking, measured as a FANN viscosity at 300 rpm, of less than 50 mPas, and a FANN-A value of less than 2.5. in the wet-end of the paper making process.

10. In a process according to claim 9, wherein said increased incorporation of starch being achieved in the absence of a fixative.

* * * * *